United States Patent [19]

Malm

[11] 4,226,717
[45] Oct. 7, 1980

[54] WASTE WATER TREATMENT

[76] Inventor: Arthur P. Malm, 1022 E. Devon Ave., Bartlett, Ill. 60103

[21] Appl. No.: 958,648

[22] Filed: Nov. 8, 1978

[51] Int. Cl.³ .............................................. C02F 3/18
[52] U.S. Cl. ................................. 210/195.1; 210/219; 210/256
[58] Field of Search ................. 210/14, 219, 256, 261, 210/8–15, 194, 195.1, 523–532, 4–7, 205, 208

[56] References Cited

U.S. PATENT DOCUMENTS

| | | | |
|---|---|---|---|
| 3,285,415 | 11/1966 | Walker | 210/532 R |
| 3,421,626 | 1/1969 | Schramm et al. | 210/256 |
| 3,579,439 | 5/1971 | Meiring et al. | 210/DIG. 28 |
| 3,900,394 | 8/1975 | Rongved | 210/14 |

FOREIGN PATENT DOCUMENTS

| | | | |
|---|---|---|---|
| 1275968 | 8/1968 | Fed. Rep. of Germany | 210/195 S |
| 2300373 | 7/1973 | Fed. Rep. of Germany | 210/219 |
| 514507 | 12/1971 | Switzerland | 210/14 |

Primary Examiner—Benoit Castel

[57] ABSTRACT

A waste water treatment system including an oxidation vessel for receipt of waste water and including structure defining an elongated, closed loop path for the flow of waste water within the vessel. One or more rotors (a) direct waste water along the path and (b) introduce oygen into the waste water within the vessel. An elongated grit chamber is disposed within the vessel and has an inlet and an outlet. The inlet and the outlet are spaced from each other along the flow path and there is provided a further inlet for introducing raw waste water into the grit chamber near the first mentioned grit chamber inlet.

8 Claims, 3 Drawing Figures

U.S. Patent　　　　　Oct. 7, 1980　　　　　4,226,717
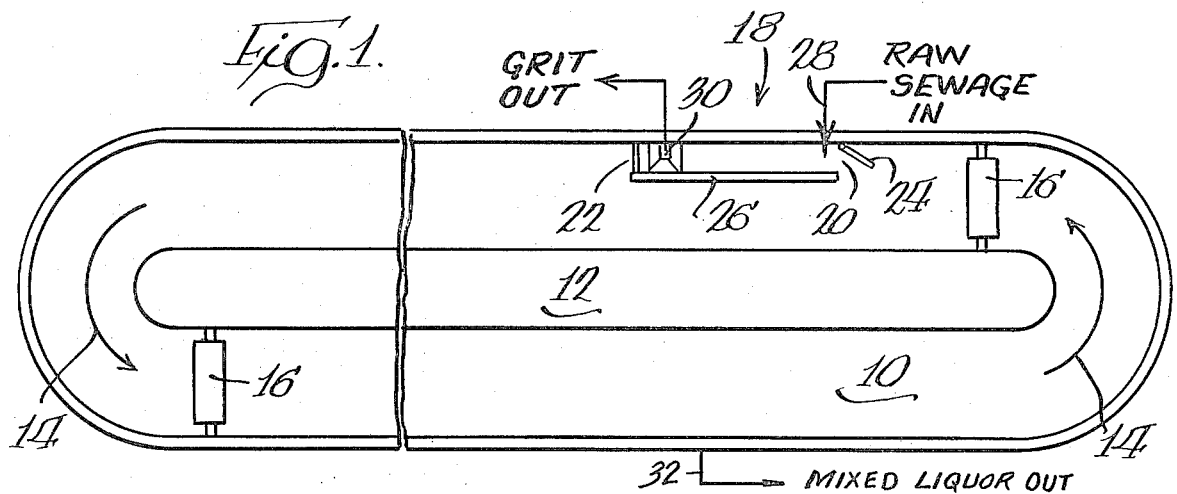
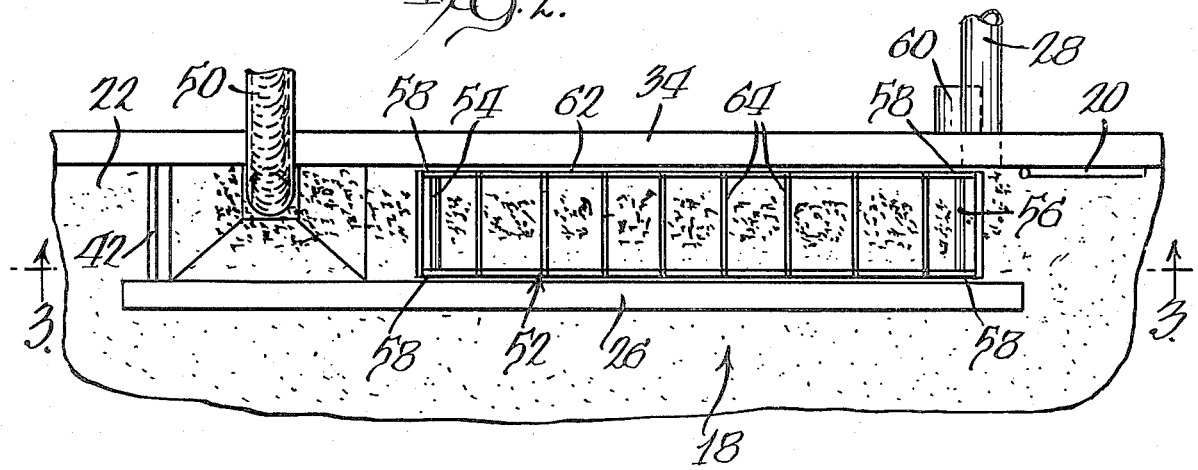
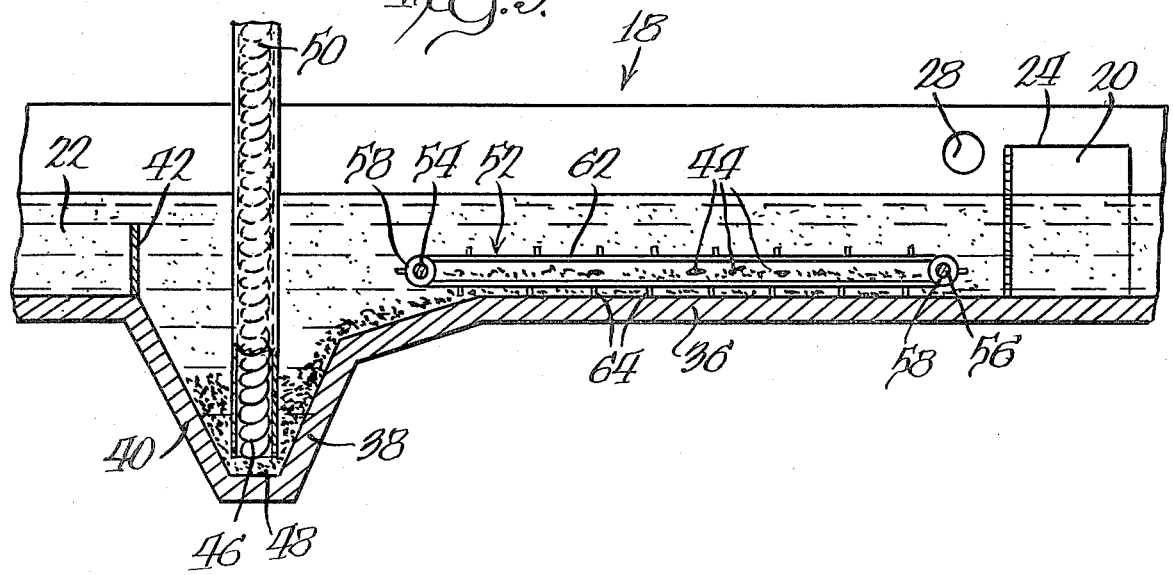

WASTE WATER TREATMENT

BACKGROUND OF THE INVENTION

This invention relates to waste water treatment systems, and more particularly, to such systems wherein provision is made for the oxidation of organic matter contained in the waste water while the same is being moved in a closed path.

Many waste water treatment facilities in use today are of the so called "activated sludge" type. Typically, such systems are provided with an oxidation or aeration basin or vessel in which the waste water follows a flow path that is a closed loop. In the usual case, raw waste water containing organic solids is introduced into the flow path after prior treatment to remove grit to prevent such grit from entering the oxidation vessel and accumulating therein. The input stream mixes with the recirculating stream, that is, the mixed liquor, and an oxygen containing medium, usually air, is introduced into the vessel to oxidize the organic material. Part of the mixed liquor is withdrawn and typically routed to a settling basin.

Typically, the grit chamber used constitutes a separate vessel upstream of the oxidation vessel wherein grit is removed. Grit is normally considered to be small inorganic particles such as sand or cinders which have a size about 200 U.S. mesh. To remove such grit, prior art grit chambers utilized raw or partially treated waste water as a fluid medium to effect liquid scour and allow centrifugal separation. To provide liquid velocity necessary to effect separation, mechanical devices such as pumps, impellers, air diffusers, or the like are required. Alternately, the necessary liquid velocity was provided by that of the incoming waste water which frequently would be mechanically advanced by a pump remote from the treatment facility.

SUMMARY OF THE INVENTION

It is the principal object of the invention to provide a new and improved waste water treatment system including a combined oxidation and grit removal means.

An exemplary embodiment of the invention achieves the foregoing object in a structure including an oxidation vessel for receipt of waste water and including means defining an elongated, closed loop path for the flow of waste water within the vessel. Means are provided for directing waste water along the path as well as means for introducing oxygen into the waste water within the vessel. An elongated grit chamber is disposed within the vessel and has an inlet and an outlet. The inlet and the outlet are spaced from each other along the path. Means are provided for introducing raw waste water into the grit chamber near the inlet thereof.

As a consequence of the foregoing construction, the need for separate oxidation and grit separation vessels required by the prior art is eliminated as is the need for special mechanical means associated with the grit chamber for providing a liquid velocity necessary to effect separation of the grit from the incoming stream.

Other objects and advantages will become apparent from the following specification taken in connection with the accompanying drawings.

DESCRIPTION OF THE DRAWINGS

FIG. 1 is a somewhat schematic, plan view of a waste water treatment system made according to the invention;

FIG. 2 is an enlarged, plan view of a grit chamber portion of the treatment system;

FIG. 3 is a side elevation of the grit chamber portion.

DESCRIPTION OF THE PREFERRED EMBODIMENT an exemplary embodiment of a waste water treatment system made according to the invention is illustrated in FIG. 1 and is seen to include a oxidation vessel 10 in the form of a so called oxidation ditch. The vessel is in the form of a oval having a central island 12 which thereby defines an elongated, closed loop flow path for the flow of waste water as schematically illustated by arrows 14.

The sides of the vessel 10 may be earthen or lined as desired.

Aeration rotors 16 of conventional construction extend across the flow path at various locations about the vessel 10 and are rotated in a conventional fashion to provide the bifold function of impelling the waste water along the flow path in the direction of the arrows and for introducing an oxygen containing medium, namely air, into the waste water. As is well known, the rotors 16 will typically be only partially submerged in the waste water within the vessel 10.

A grit chamber, generally designated 18, is disposed within the vessel 10 at any suitable location therein. As illustrated in FIG. 1, the grit chamber 18 is wholly within the conventional configuration of the vessel 10 but it is to be understood that if desired, a recess in one of the outer walls of the vessel 10 or in one of the walls of the central island 12 could be used as well.

The grit chamber 18 is elongated in the direction of flow within the vessel 10 and at its upstream end includes an inlet 20. At its downstream end, and spaced from the inlet 20, is an outlet 22. Preferably, the inlet end 20 is provided with a flow control gate 24 which may take on any desired form and which may be set at any of a variety of positions between fully open and fully closed so as to control the amount of flow of mixed liquor from the remainder of the vessel 10 into the interior of the grit chamber 18 through the inlet 20.

To prevent unwanted entry of mixed liquor into the grit chamber 18 at locations other than the inlet 20, spaced inwardly from the outer wall of the vessel 10 is an upstanding wall 26 which extends above the intended liquid level of mixed liquor within the vessel 10.

An inlet for raw sewage or waste water to be treated is schematically shown at 28 and is located near the inlet 20 for the grit chamber 18. Raw sewage or waste water containing grit as well as organic material is introduced at that point and mixed with the mixed liquor entering the grit chamber 18 through the inlet 20.

A grit removal station 30 is also provided and generally will be adjacent the outlet 22 of the grit chamber 18. Grit accumulating within the grit chamber 18 is removed at the station 30 by means to be shown.

The overall system is completed by a suitable outlet 32 at a desired location from which mixed liquor may be diverted to a settling tank or the like.

FIGS. 2 and 3 illustrate the grit chamber 18 in greater detail. With reference to FIG. 2, the location of the wall 26 with respect to an outer wall 34 of the vessel 10 is apparent. The bottom of the vessel is designated 36

(FIG. 3). Between the walls 26 and 34, the bottom 36 is provided with a hopper-like depression 38, the downstream side 40 of which acts as a baffle.

Just down stream of the depression 38 there may be provided an upstanding baffle 42. Incoming waste water or raw sewage will enter the grit chamber via the conduit 28 to be mixed with mixed liquor entering the grit chamber through the inlet 20. The velocity of the mixed liquor through the grit chamber 18, which velocity is generated by the rotors 16, will scour grit particles 44 from organic material within the grit chamber. The higher density of the inorganic grit will cause the same to settle out on the bottom 36 of the vessel 10 within the grit chamber 18 and the velocity of the mixed liquor within the grit chamber 18 will tend to cause the grit 44 to move to the depression 38 to accumulate therein. Smaller grit particles, which wll tend to remain in suspension longer, will be prevented from leaving the outlet 22 of the grit chamber to enter the remainder of the vessel 10 by either the downstream side 40 of the depression 38 or the baffle 42, or both. At the same time, because the organic material will remain suspended due to turbulence and the velocity of the mixed liquor stream, the same will pass over the baffle 42 to exit the grit chamber 18 and enter the remainder of the vessel 10.

An elevating conveyor 46 which may be of any suitable type such as an auger conveyor, a bucket conveyor or the like, has one end 48 within the depression 38 and an upper end 50 disposed exteriorly of the vessel 10. When there has been sufficient grit accumulation within the depression 38, the conveyor 46 may be energized to remove the accumulated grit therefrom. Alternately, a pump operated suction line may be used as the elevating conveyor in lieu of an auger or bucket conveyor.

In some cases, heavier grit particles, which will tend to settle out more rapidly than lighter grit particles, may settle out well upstream of the depression 38. In order to prevent an accumulation of such heavier grit particles that would impede flow of the mixed liquor through the grit chamber, a scraper, generally designated 52 may be employed.

Two shafts 54 and 56 are disposed within the grit chamber 18 with the former being near the upstream end of the depression 38 and the latter being adjacent to the inlet 20. Sprockets 58 are carried by the shafts and the shaft 56 may be driven selectively by a motor 60. Chains 62 are trained about the sprockets as illustrated adjacent the walls 26 and 34 and scraper flights such as metal bars 64 extend between the chains 62. The lower run of the chains 62 is closely adjacent to the bottom 36 of the vessel within the grit chamber 18 and as a consequence, upon energization of the motor 60, the scraper flights 64 move grit particles 44 accumulating near the inlet 20 downstream to the depression 38 to be accumulated therein.

From the foregoing it will be appreciated that the invention provides a number of advantages over prior art structures. For one, separate vessels for grit separation and oxidation or aeration, as required by the prior art are avoided since the grit chamber of the present invention is located within an aeration or oxidation vessel 10. Construction expense is thus minimized.

At the same time, operating expense is similarly minimized. The invention avoids any need for separate pumps, impellers or diffusers etc. for separating grit from organic material in the incoming waste water stream. Nonetheless, sufficient liquid scouring of the organic material necessary to achieve separation of the grit occurs by reason of the velocity of the mixed liquor moving within its closed path. This velocity is, of course, provided by the rotors 16 or other such means conventionally used but since they are required in any event to achieve the desired movement of the liquid as well as the introduction of oxygen into the mixed liquor, the operating cost of the grit chamber of the present invention is no different than that of an oxidation vessel alone (save for periodic use of the scraper and the grit removing conveyor).

Moreover, maintenance of velocity inducing mechanical equipment heretofore associated with prior art grit chambers is avoided as is the expense of its initial purchase. In addition, many grit chambers have a relatively high head loss, much of which is avoided by the present invention. This in turn decreases pumping requirements in the overall system thereby enabling the use of less expensive pumping equipment and minimizing running costs.

Finally, because the present invention separates the grit from the liquid by way of the velocity of a mixed liquor as opposed to a raw sewage or the like, such organic material as may be present in the grit when removed from the grit chamber will be at least partially treated by oxidation. Consequently, grit removed from the chamber will have a lesser concentration of untreated organic materials than with prior art constructions. Such untreated organic materials in high concentrations increase noxious odors providing a disposal problem for the grit which is minimized or avoided entirely by the present invention.

What is claimed is:

1. In a waste water system, the combination of:
   an oxidation vessel including spaced walls for receipt of waste water therebetween, said walls defining an elongated, closed loop path for the flow of waste water within the vessel;
   means for directing waste water along said path;
   means for introducing oxygen into waste water between said spaced walls;
   an additional wall between said spaced walls defining an elongated grit chamber within said vessel having an inlet and an outlet defined by the ends of said additional wall, said inlet and outlet being spaced from each other along and within said path, said grit chamber, remote from said inlet, being provided with means disposed below the intended level of waste water within said vessel for retaining grit within said chamber to prevent it from entering the remainder of said vessel while allowing organic material to pass from said outlet into said vessel remainder to be oxidized therein;
   means for introducing raw waste water into said grit chamber near said inlet by introducing waste water between one of said spaced walls and said additional wall near the inlet end of the additional wall; and
   a mixed liquor outlet in said vessel.

2. The waste water treatment system of claim 1 wherein said inlet is provided with a flow control gate.

3. The waste water treatment system of claim 1 wherein said retaining means comprises a hopper-like collecting structure formed in the bottom of said grit chamber.

4. The waste water treatment system of claim 1 wherein said retaining means comprises an upstanding baffle on the bottom of said grit chamber.

5. The waste water treatment system of claim 1 further including conveyor means for removing grit accumulated in said grit chamber.

6. The waste water treatment system of claim 5 further including scraper means extending along the bottom of said grit chamber and operable to direct accumulated grit to said conveyor means for removal thereby.

7. The waste water treatment system of claim 1 wherein said retaining means includes a hopper-like depression in the bottom of said grit chamber near said outlet, an elevating conveyor having one end in said depression and another end out of said vessel for removing grit accumulating in said depression, and means for directing grit in said chamber toward said depression for removal by said conveyor.

8. The waste water treatment system of claim 1 wherein said waste water directing means and said oxygen introducing means comprise at least one rotor extending across said path and located at least partly below the intended level of waste water therein.

* * * * *

UNITED STATES PATENT AND TRADEMARK OFFICE
CERTIFICATE OF CORRECTION

PATENT NO. : 4,226,717
DATED : October 7, 1980
INVENTOR(S) : Arthur P. Malm

It is certified that error appears in the above—identified patent and that said Letters Patent is hereby corrected as shown below:

On the Title Page insert

-- (73) Assignee: Lakeside Equipment Corporation, Bartlett, Illinois --.

Signed and Sealed this

Third Day of March 1981

[SEAL]

Attest:

RENE D. TEGTMEYER

Attesting Officer   Acting Commissioner of Patents and Trademarks